(12) United States Patent
Bohlke et al.

(10) Patent No.: US 10,308,152 B2
(45) Date of Patent: Jun. 4, 2019

(54) VEHICLE SEAT

(71) Applicants: Hartmut Bohlke, Wuppertal (DE); Wolfgang Sitzler, Wuppertal (DE); Bogdan Tutelea, Leichlingen (DE); Andreas Göbbels, Kürten (DE); Tanja Pink, Wuppertal (DE); Jan Boddenberg, Köln (DE)

(72) Inventors: Hartmut Bohlke, Wuppertal (DE); Wolfgang Sitzler, Wuppertal (DE); Bogdan Tutelea, Leichlingen (DE); Andreas Göbbels, Kürten (DE); Tanja Pink, Wuppertal (DE); Jan Boddenberg, Köln (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/701,880

(22) Filed: Sep. 12, 2017

(65) Prior Publication Data
US 2018/0072200 A1 Mar. 15, 2018

(30) Foreign Application Priority Data
Sep. 13, 2016 (DE) .......................... 10 2016 217 454

(51) Int. Cl.
*B60N 2/75* (2018.01)

(52) U.S. Cl.
CPC .............. *B60N 2/787* (2018.02); *B60N 2/75* (2018.02); *B60N 2/753* (2018.02); *B60N 2/767* (2018.02)

(58) Field of Classification Search
CPC .......... B60N 2/787; B60N 2/753; B60N 2/75; B60N 2/767

USPC ..... 297/411.25–411.28, 411.2, 411.3, 411.32
See application file for complete search history.

(56) References Cited

U.S. PATENT DOCUMENTS

| | | | |
|---|---|---|---|
| 5,597,209 A * | 1/1997 | Bart | B60N 2/767 297/411.38 |
| 5,733,010 A * | 3/1998 | Lewis | A47C 7/543 297/115 |
| 6,916,068 B2 * | 7/2005 | Kitamura | A47C 1/03 297/411.3 |
| 7,255,402 B1 * | 8/2007 | Haddad | B60N 2/76 297/411.32 |
| 7,494,189 B2 | 2/2009 | Otto et al. | |
| 8,950,816 B2 * | 2/2015 | Ott | B60N 2/4606 297/411.32 |

(Continued)

FOREIGN PATENT DOCUMENTS

DE 100 50 528 A1 4/2002
DE 10 2004 003 251 A1 8/2005

(Continued)

OTHER PUBLICATIONS

Office Action of German Patent Office issued in Application No. 10 2016 217 454.1 dated Jun. 26, 2017 (4 pages).

*Primary Examiner* — Mark R Wendell
(74) *Attorney, Agent, or Firm* — Flynn Thiel, P.C.

(57) ABSTRACT

A vehicle seat having a supporting structure, having a seat surface and having a back rest, and having at least one arm rest arrangement which is held on the supporting structure. The arm rest arrangement includes a fixation unit which is capable of being attached to a complementary accommodating unit of the supporting structure or detached from the accommodating unit without a tool.

5 Claims, 12 Drawing Sheets

(56) References Cited

U.S. PATENT DOCUMENTS

| | | | |
|---|---|---|---|
| 2002/0096928 A1* | 7/2002 | Bidare | B60N 2/767 297/411.32 |
| 2006/0061189 A1* | 3/2006 | Yamane | B60N 2/767 297/411.32 |
| 2008/0018160 A1 | 1/2008 | Otto et al. | |
| 2010/0289486 A1* | 11/2010 | Ehlebrecht | G01D 5/145 324/207.25 |

FOREIGN PATENT DOCUMENTS

| | | |
|---|---|---|
| DE | 10 2005 002 853 B3 | 4/2006 |
| DE | 10 2008 014 891 A1 | 9/2009 |

* cited by examiner

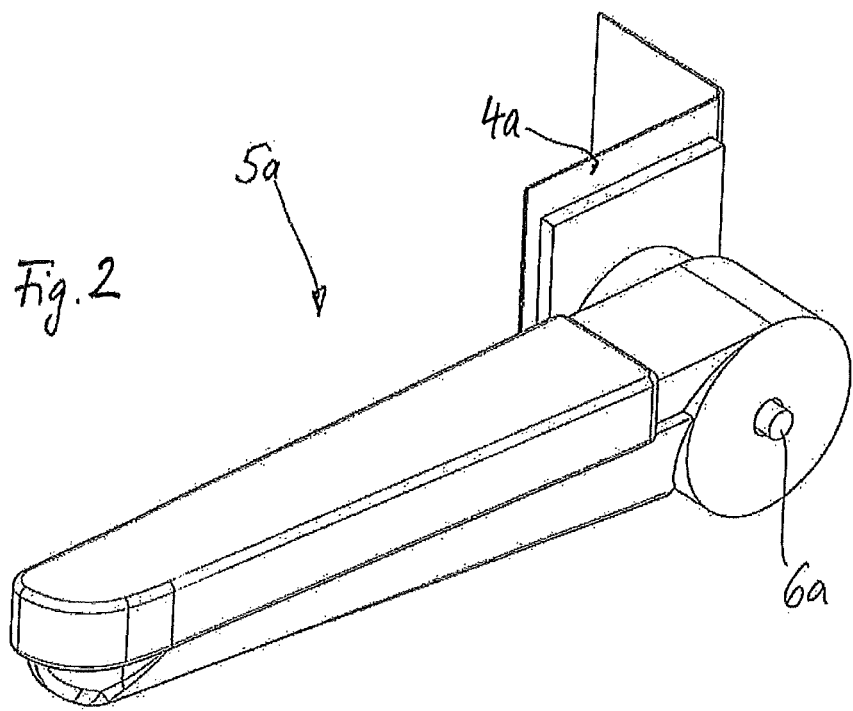
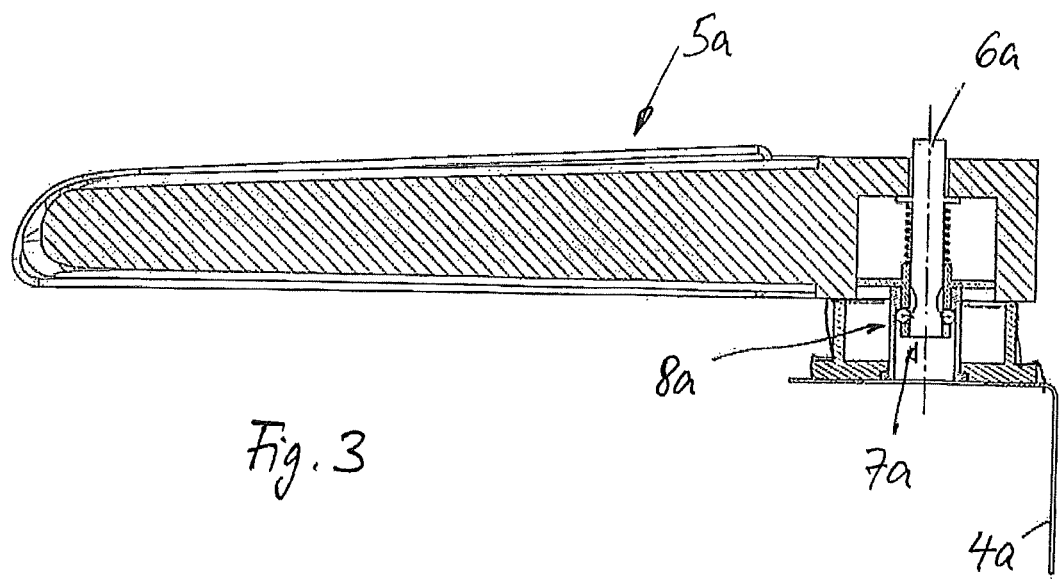

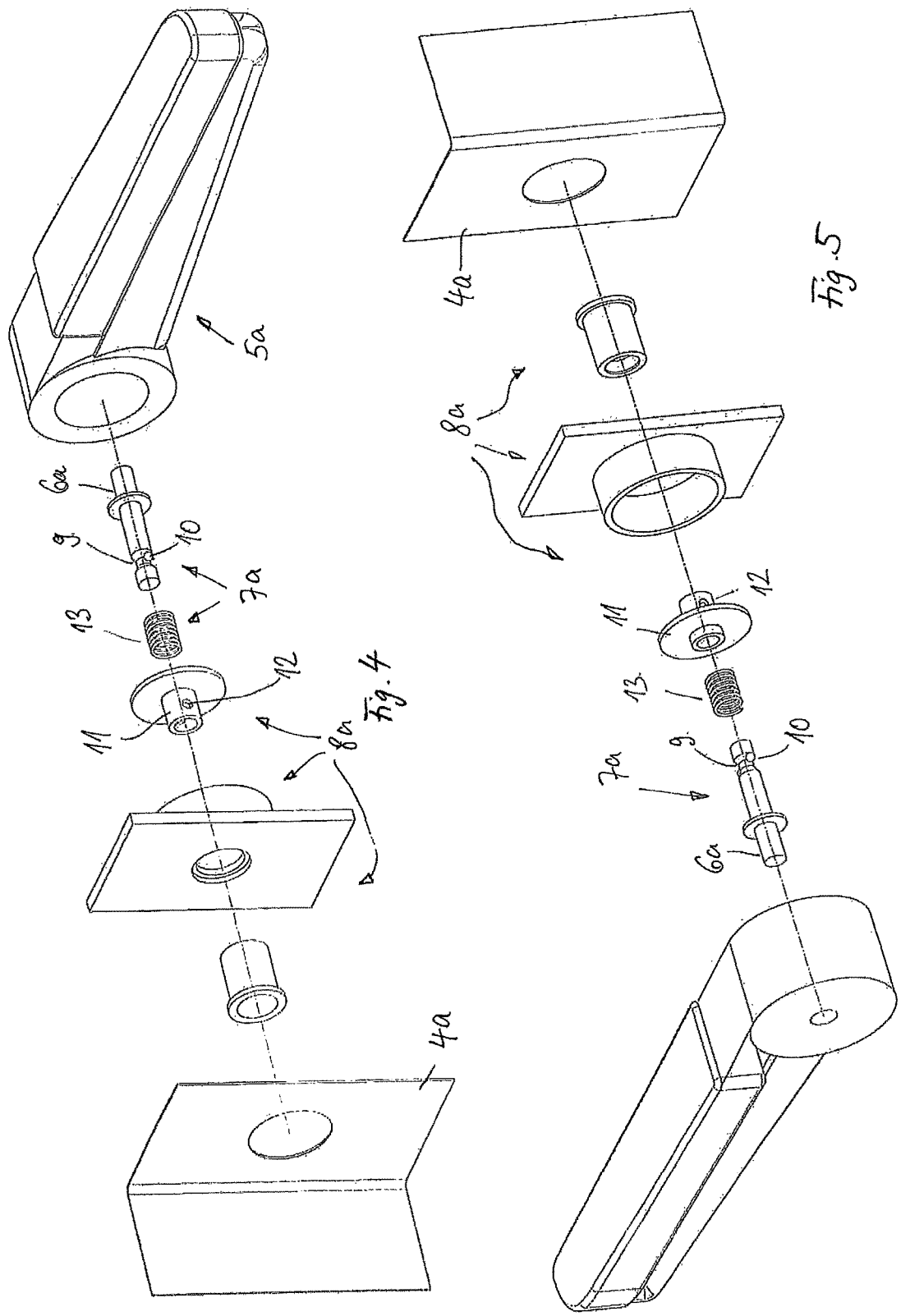

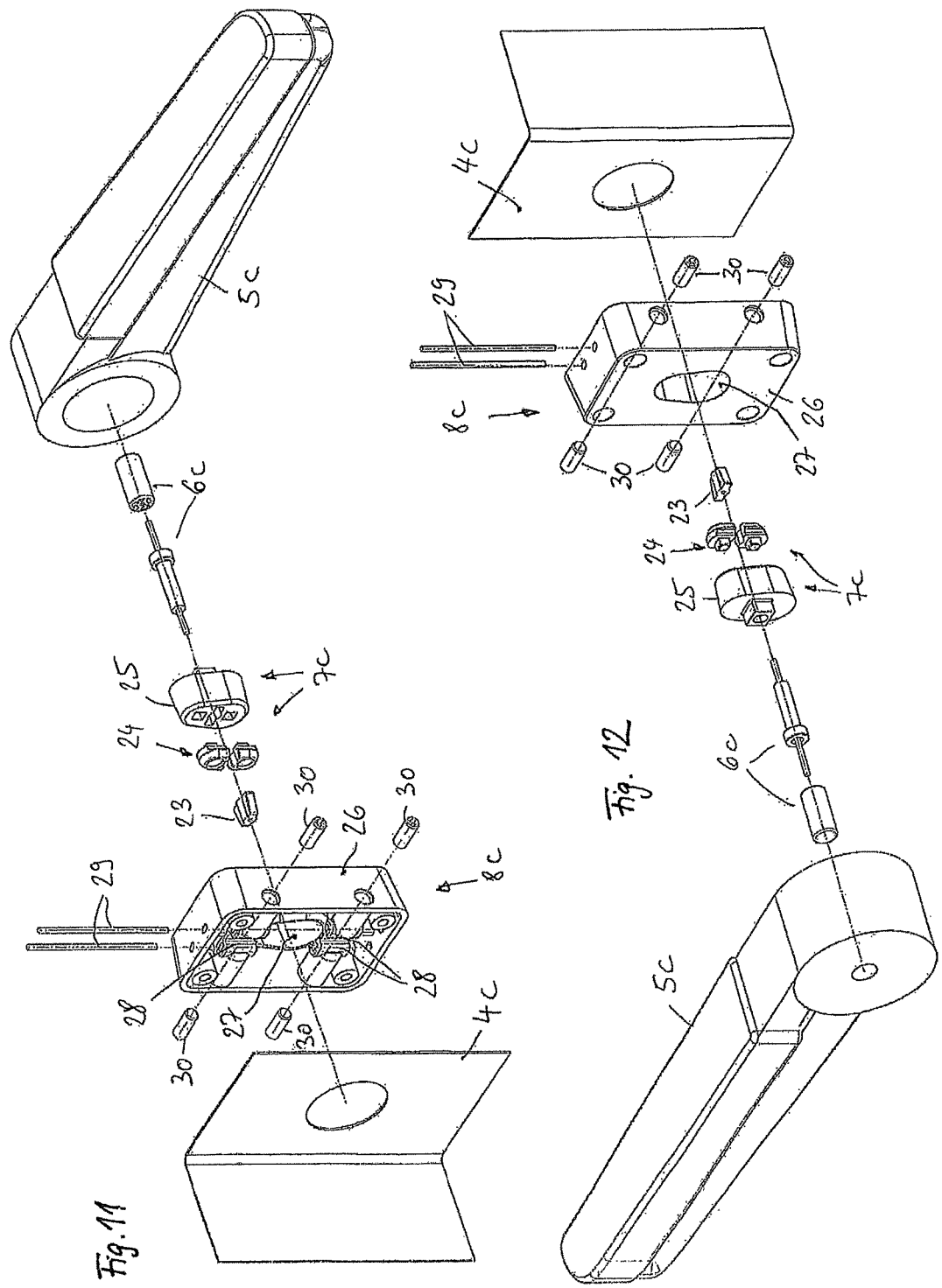

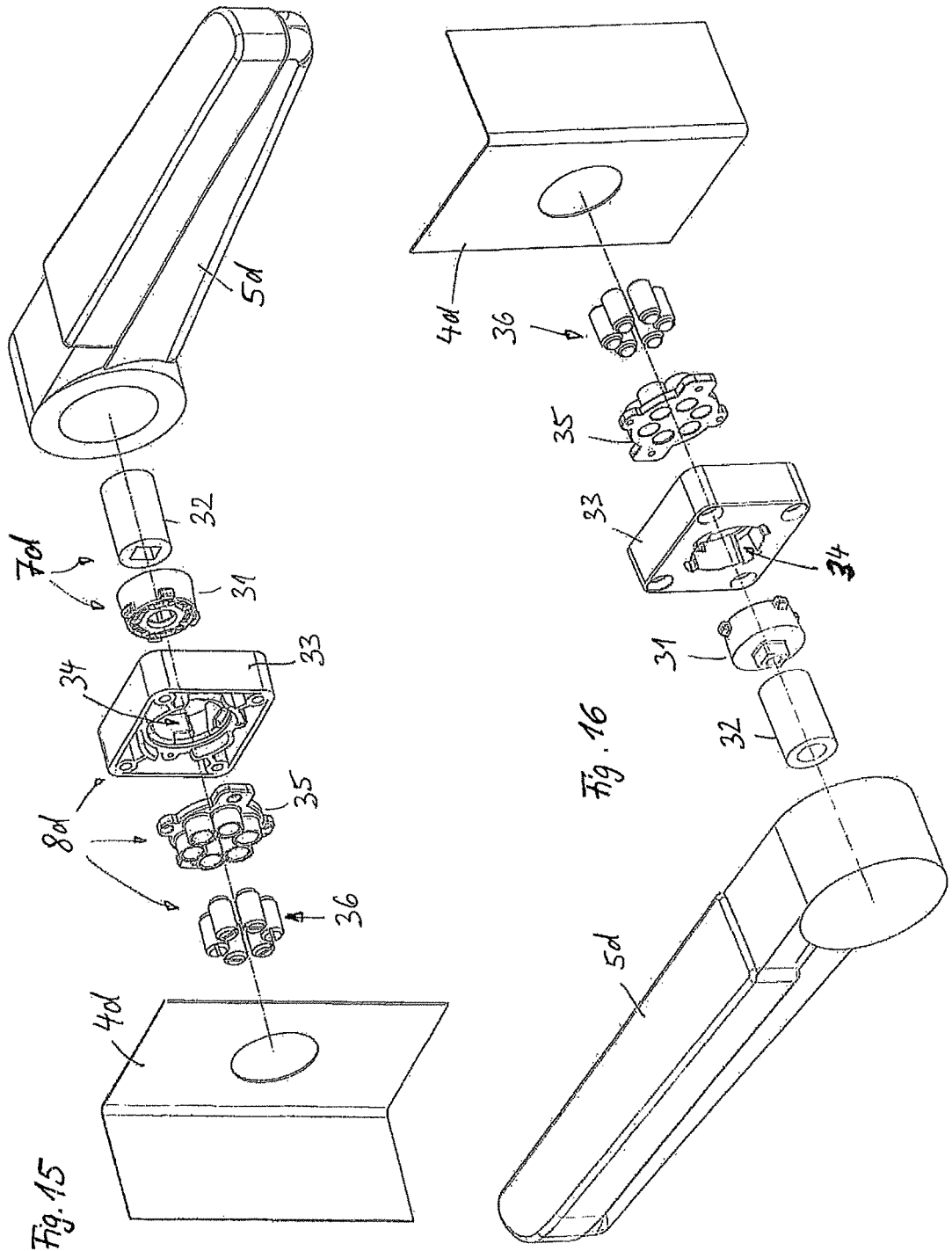

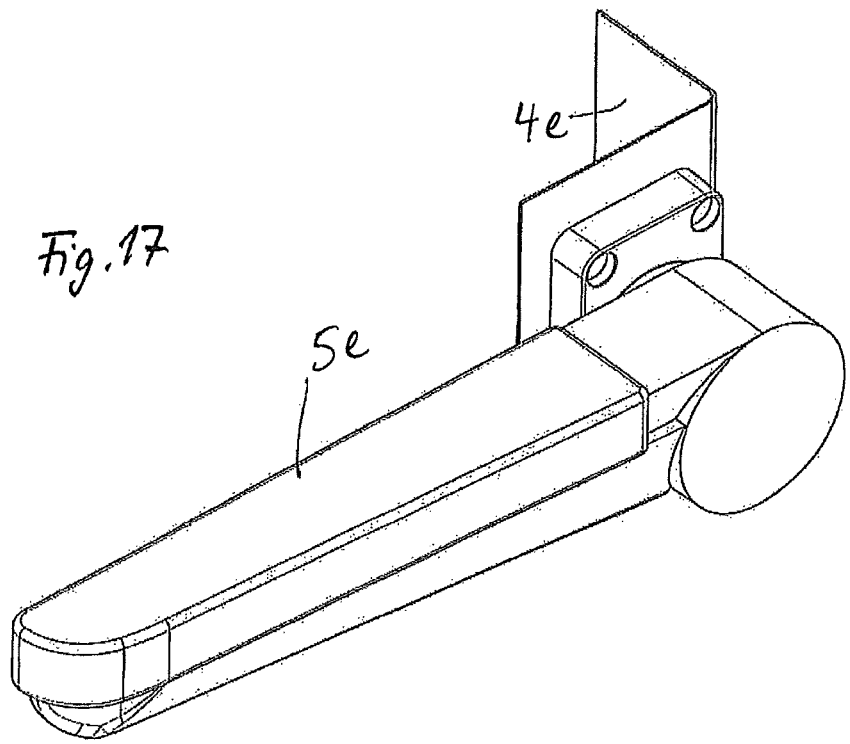
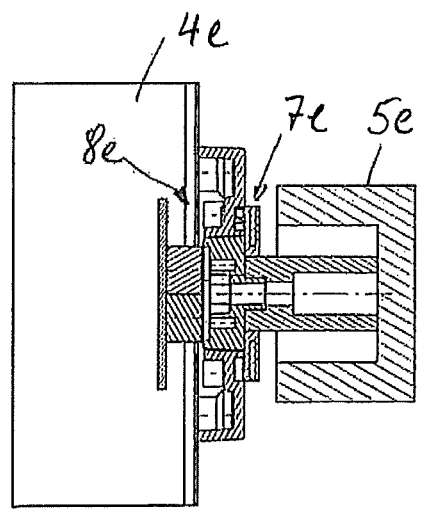

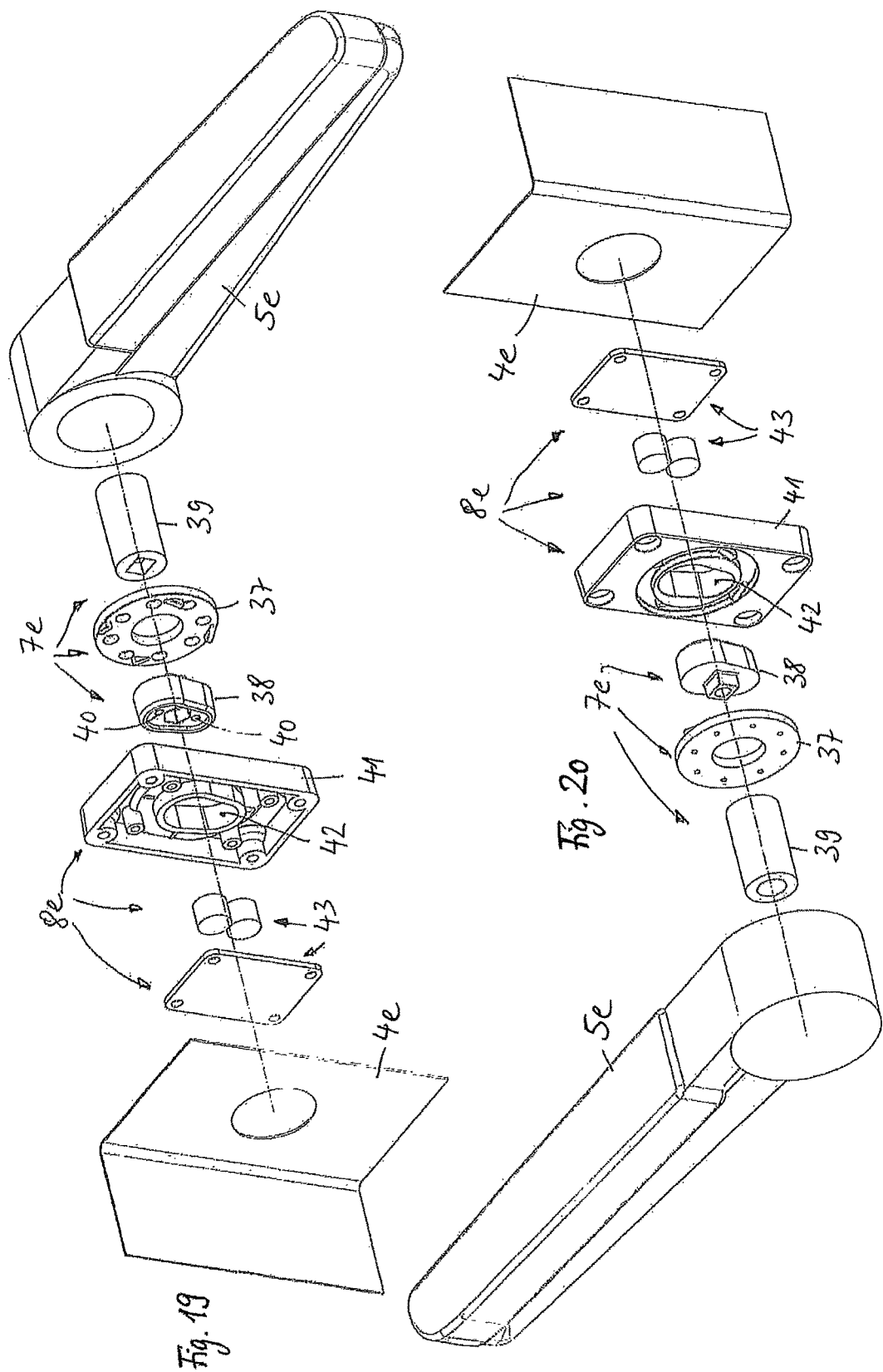

VEHICLE SEAT

CROSS-REFERENCE TO RELATED APPLICATIONS

This claims priority from German Application No. 10 2016 217 454.1, filed Sep. 13, 2016, the disclosure of which is hereby incorporated by reference in its entirety.

FIELD OF THE INVENTION

The invention relates to a vehicle seat having a supporting structure, having a seat surface and having a back rest, and having at least one arm rest arrangement which is held on the supporting structure.

Such a vehicle seat is generally known for minibuses, saloon cars or vans. The vehicle seat is disposed within a vehicle interior and has a dimensionally stable supporting structure both in an area of the seat surface and in an area of the back rest, each covered respectively by an upholstery and a cover for forming a seat surface and for forming a back rest. An arm rest arrangement is fixed to the supporting structure and may be provided with a pivotable arm rest body.

SUMMARY OF THE INVENTION

The object of the invention is to provide a vehicle seat of the type mentioned at the outset that allows improved variability of the vehicle seat by simple means.

This object is achieved in that the arm rest arrangement includes a fixation unit which is capable of being attached to a complementary accommodating unit of the supporting structure or detached from the accommodating unit without a tool. Using the solution according to the invention, the at least one arm rest arrangement can be removed from the vehicle seat or be installed on the vehicle seat in a simple manner without a tool. Thereby, within a corresponding motor vehicle, i.e., in a vehicle interior, variability to be implemented by an operator in a rapid and simple way is facilitated. The solution according to the invention is utile with particular advantage in minibuses for passenger transportation or in other passenger cars in the form of saloon cars or vans. Similarly, the invention is utile in vehicle seats of railway vehicles or airplanes, and also in other land craft like trucks, recreational vehicles, motorhomes or large buses. Advantageously, the vehicle seat has a respective arm rest arrangement on both sides so that a passenger sitting on the vehicle seat can rest on the arm rest both to the left and to the right hand sides. Such a vehicle seat is also referred to as a "Captain's Chair". In case of according space demand in the vehicle interior, the invention allows in a simple manner to remove the respective arm rest arrangement without a tool. The attachment or detachment without a tool allows rapid and simple adaptation of the vehicle interior to the respective space utilization. In a vehicle interior of a corresponding vehicle are placed preferably a plurality of vehicle seats according to the invention. The supporting structure is advantageously a dimensionally stable metallic structure which is provided both in the area of the seat surface and also in the area of the back rest. The supporting structure is attached vehicle-fixed in the vehicle interior and includes a multiplicity of adjustment options, in order to adapt a sitting position of the vehicle seat in the vehicle interior. The supporting structure is covered by an upholstery and a seat cover both in the area of the seat surface and also in the area of the back rest, in order to achieve a corresponding seat surface and a corresponding back rest for a passenger sitting on the vehicle seat. Moreover, the supporting structure is provided with a headrest portion in the area of the back rest, which headrest is likewise upholstered and provided with a cover, as are the seat surface and the back rest. The headrest portion can be integral to the back rest or be produced as a separate component and be connected to the supporting structure in the area of the back rest. The arm rest arrangement can be mounted rigidly or pivotably in relation to the supporting structure.

In an embodiment of the invention, the fixation unit or the accommodating unit includes a movable latching mechanism, and an actuating member coupled to the latching mechanism is provided to displace the latching mechanism between a latched position and a released position. The latching mechanism includes at least one mechanical latching element which is movably mounted and cooperates with a stationary latch profile of the latching mechanism. The at least one movable latching element is associated with either the fixation unit or the accommodating unit. In a correspondingly inverse manner, the at least one complementary latch profile is associated with the accommodating unit or the fixation unit.

In a further embodiment of the invention, the actuating member is mounted for linear movement or for rotational movement. The linear mobility and the rotational mobility, respectively, are related to an attachment or detachment direction of the arm rest arrangement in relation to the supporting structure. If the arm rest arrangement is disposed by means of the fixation unit laterally on the exterior of the accommodating unit of the supporting structure, then the attachment and detachment directions correspond to a transverse direction of the vehicle seat, i.e., a horizontal transverse extension across a vehicle seat width. If the vehicle seat is oriented in the driving direction of the vehicle, said transverse extension and, consequently, the attachment and detachment directions correspond to a vehicle transverse direction. Consequently, the linear mobility of the actuating member means mobility in the transverse extension direction and the rotational mobility of the actuating member means rotational mobility about a rotational axis oriented in the transverse extension direction.

In a further embodiment of the invention, the latching mechanism is effective in a form-fitting force-limited manner, and an adjustment device is provided for adjusting a retaining force of the latching mechanism. The force limitation of the form-fitting of the latching mechanism is in particular provided for movement of the actuating member, in order to transfer the latching mechanism from the latched position to the released position. Using the adjustment device, the retaining force of the latching mechanism is adjustable. What is meant thereby is, in particular, the retaining force of a movement of the actuating member during displacement of the latching mechanism from the latched position to the released position by the actuating member. The adjustment device is to adjust the actuating force which is needed to transfer the latching mechanism to the release position using the actuating member.

In a further embodiment of the invention, the latching mechanism includes a bayonet catch function. The bayonet catch function effects secure form-fitted retention in the axial direction, i.e., in the attachment or detachment direction. Said latching mechanism is associated with a rotatable actuating member. A force limitation of the form fitting of the latching mechanism in the rotational direction is provided for the rotational mobility of the actuating member.

In a further embodiment of the invention, the latching mechanism includes a spring force-loaded securing device to retain the latching mechanism in the latched position in a force limited manner. The securing device is preferably in operative connection to the adjustment device, in order to allow adjusting of a retaining force of the securing device. The adjustment of the retaining force is preferably made by the manufacturer during the production procedure of the vehicle seat.

In a further embodiment of the invention, the fixation unit or the accommodating unit include a magnetic securing feature, and an actuating member is provided which is mounted to be movable between a release position reducing a magnetic function of the magnetic securing feature and a securing position producing the magnetic function. Accordingly, by corresponding movement of the actuating member, the magnetic function of the magnetic securing feature can be neutralized, whereby the arm rest arrangement can be removed from the vehicle seat in a simple manner. For reattachment, the actuating member is advantageously moved such that the magnetic function of the magnetic securing feature is effective and, consequently, the arm rest arrangement is held secure on the supporting structure counter the removal direction.

In a further embodiment of the invention, the magnetic securing feature includes at least one permanent magnet on the fixation unit or the accommodating unit, and the accommodating unit or the fixation unit is associated with at least one complementary, magnetizable metallic part. The magnetic securing feature and, consequently, the at least one permanent magnet, act in the detachment direction and in the attachment direction, respectively. This means that an operator cannot pull the arm rest arrangement away from the supporting structure when the magnetic function of the at least one permanent magnet is activated, since the magnetic force of the at least one permanent magnet presents a corresponding counter force.

In a further embodiment of the invention, the actuating member is rotatably mounted, and the magnetic securing feature is effective in a connecting direction or release direction of the fixation unit. This corresponds to the attachment and detachment directions. Owing to the rotatability of the actuating member, an axial motion is transferred to the arm rest arrangement in the taking-off direction, whereby the at least one magnetizable metallic part and the at least one permanent magnet move apart from each other. Thereby, the magnetic force acting on the arm rest arrangement is reduced such that the arm rest arrangement can be removed from the supporting structure.

Further advantages and features of the invention are found in the claims and in the description below of preferred exemplary embodiments of the invention, illustrated with reference to the drawings.

BRIEF DESCRIPTION OF THE DRAWINGS

FIG. 2 shows a detailed illustration of a portion of a vehicle seat according to FIG. 1 in a first embodiment;

FIG. 3 shows the portion of the vehicle seat according to FIG. 2 in a sectional view;

FIGS. 4 and 5 show perspective exploded views in different perspectives of the portion of the vehicle seat according to FIGS. 2 and 3;

FIGS. 11 and 12 show in two different perspectives exploded views of the portion according to FIGS. 9 and 10;

FIGS. 15 and 16 show in different perspectives an exploded view of the portion according to FIGS. 13 and 14;

FIG. 17 shows in a perspective view a portion of a fifth embodiment of a vehicle seat according to the invention according to FIG. 1;

FIG. 18 shows a cross sectional view of the portion according to FIG. 17;

FIGS. 19 and 20 show in different perspectives an exploded view of the portion according to FIGS. 17 and 18.

DETAILED DESCRIPTION

Figure 1:
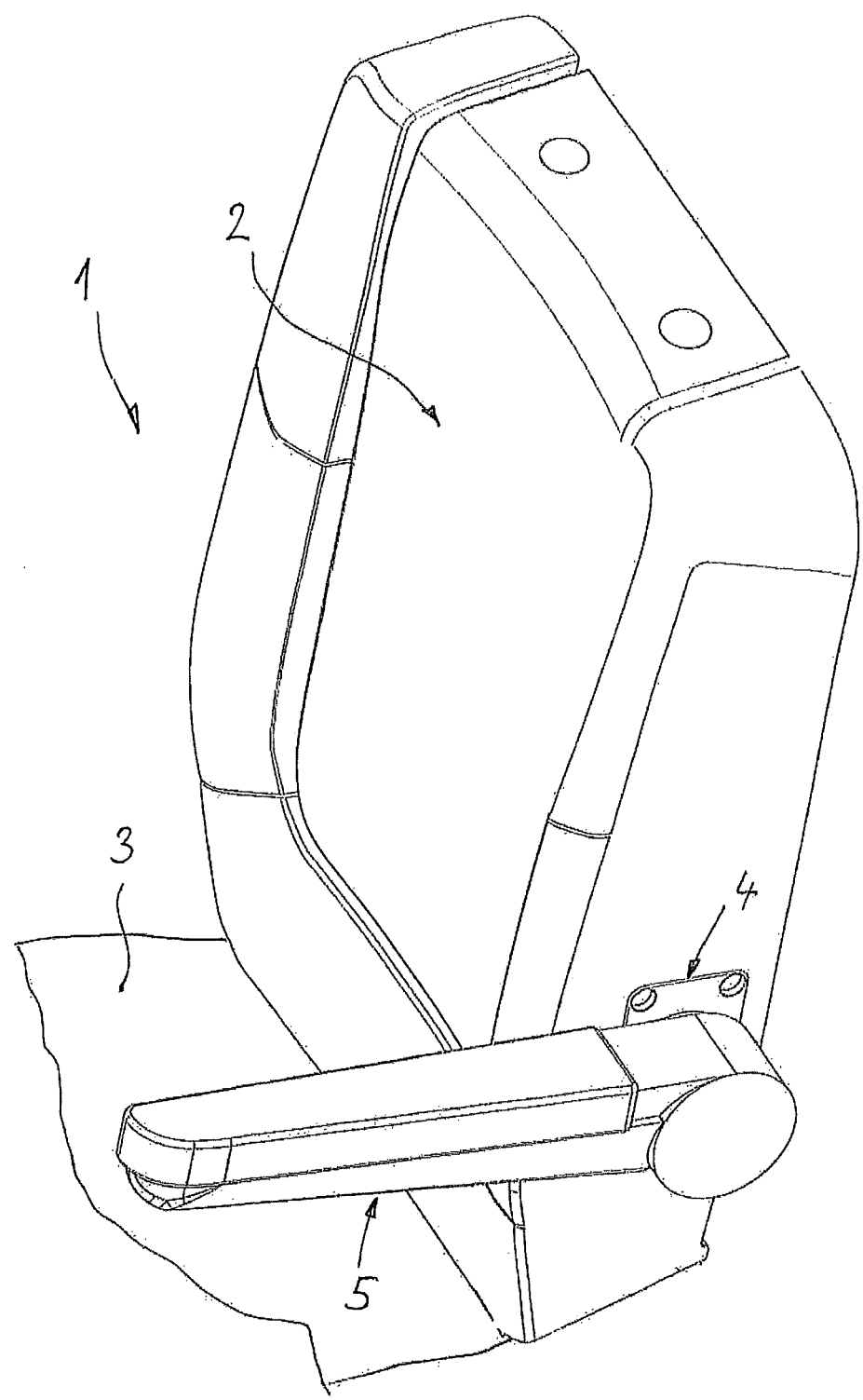
FIG. 1 shows in a perspective view and schematic illustration an embodiment of a vehicle seat according to the invention.

A vehicle seat 1 according to FIG. 1 is placed in a vehicle interior of a motor vehicle in a manner not illustrated in more detail. The vehicle seat 1 is installed vehicle-fixed in the vehicle interior. The vehicle seat 1 includes a supporting structure 4 which is largely concealed by a back rest 2 and a seat surface 3 in FIG. 1. The supporting structure 4 is a dimensionally stable metallic structure to stabilize the seat surface 3 and the back rest 2. The supporting structure is largely completely covered by corresponding upholstery and seat covers in the area of the back rest 2 and in the area of the seat surface 3. The supporting structure includes adjustment devices, not illustrated in more detail, in order to allow adjusting of the vehicle seat 1 in the longitudinal direction within the vehicle interior or to allow turning of said seat within the vehicle interior. Moreover, the supporting structure 4 includes at least one adjustment device, in order to allow adjusting of an inclination of the back rest 2 relative to the seat surface 3.

As is apparent with reference to FIG. 1, the vehicle seat 1 is also provided with an arm rest arrangement 5 which is fixed in the area of a side panel of the back rest 2 to an accommodating unit of the supporting structure 4. The arm rest arrangement 5 in the mounted condition can be rigidly disposed on the supporting structure 4 or be pivotably mounted in relation to a seat transverse axis. With reference to FIG. 1, merely the left-hand arm rest arrangement 5, as seen in the sitting direction, is illustrated. However, the vehicle seat 1 can also be provided with a further, right-hand arm rest arrangement, as seen in the sitting direction, which is held on the opposite right-hand side panel of the back rest 2 on the supporting structure 4 mirror-symmetrical to the arm rest arrangement 5, and has an identical design mirror-symmetrical to the arm rest arrangement 5 and the fixation of the arm rest arrangement 5 on the accommodating unit of the supporting structure 4.

With reference to FIGS. 2 to 20, five different embodiments of vehicle seats 1 according to FIG. 1 are illustrated, wherein with reference to FIGS. 2 to 20 merely the respective differences in the area of the fixation and option for taking off without a tool of the arm rest arrangement 5 in relation to the supporting structure 4 of the vehicle seat 1 are illustrated. Accordingly, with reference to FIGS. 2 to 20 merely the respective accommodating unit in the area of the supporting structure and a complementary fixation unit of the arm rest arrangement 5 for fixing and taking off of the arm rest arrangement 5 in relation to the supporting structure 4 of the respective embodiment of the vehicle seat are illustrated. The other functional portions and functional parts of the respective vehicle seat are identical to those of the vehicle seat 1, as is apparent with reference to FIG. 1 and described above. The different embodiments, as illustrated with reference to FIGS. 2 to 20, are marked with the same reference numerals with the letter "a" added thereto for the first exemplary embodiment, with the letter "b" added thereto for the second exemplary embodiment, with the letter "c" added thereto for the third exemplary embodiment, with the letter "d" added thereto for the forth exemplary embodiment, and with the letter "e" added thereto for the fifth exemplary embodiment, in relation to the functionally concordant parts and portions. To avoid repetitions, in relation to each of the illustrated and described exemplary embodiments, reference is made to the general explanations related to the vehicle seat 1 according to FIG. 1.

A vehicle seat according to the embodiment of FIGS. 2 to 5 includes a supporting structure 4a to which an accommodating unit 8a for mounting the arm rest arrangement 5a is attached. The arm rest arrangement 5a includes a fixation unit 7a which cooperates with the accommodating unit 8a in the installed condition of the arm rest arrangement 5a. For securing the fixation unit 7a on the accommodating unit 8a, a latching mechanism is provided and will be described in more detail below. Said latching mechanism is transferable from a latched position to a released position by an actuating member 6a, wherein the arm rest arrangement 5a can be taken off the accommodating unit 8a and off the supporting structure 4a. With reference to FIGS. 3 to 5 the axes illustrated in dot and dash lines represent attachment and detachment axes for the arm rest arrangement 5a in relation to the supporting structure 4a.

The actuating member 6a extends alongside the attachment and detachment axis in the seat transverse direction passing through the arm rest arrangement 5a and is accessible in the type of a press button in the region of an exterior side of the arm rest arrangement 5a (FIGS. 2 and 3). The actuating member 6a is an elongate latch bolt which has a cylindrical design and includes an annular groove 9 on its end region remote from the press button side, which groove is provided, in both axial directions, with conical ramp surfaces facing one another and oriented in opposite directions. Within the annular groove 9 are positioned two latch balls 10 which are secured in position within the annular groove via an elastic ring in a manner not illustrated in more detail. Moreover, the actuating member 6a is associated with a return spring 13 in the form of a helical compression spring, which is coaxially pushed on the latch bolt of the actuating member 6a. The return spring 13 is supported on the one hand side on an annular shoulder of the actuating member 6a and on the other hand side on an annular flange of a latch sleeve 11 of the accommodating unit 8a. The latch sleeve 11 has on opposite sides two cylindrical latch recesses 12 which are provided transversely to the attachment and detachment axis in a sleeve shell of the latch sleeve 11. The latch recesses 12 cooperate with the latch balls 10 in the installed condition, in order to secure the arm rest arrangement 5a to the accommodating unit 8a and, thus, to the supporting structure 4a. The accommodating unit 8a including the latch sleeve 11 is fixed to the supporting structure 4a in a manner not illustrated in more detail, in particular by welding or screwing.

In the installed condition, the latch balls 10 are latched in the latch recesses 12 of the latch sleeve 11, whereby the fixation unit 7a of the arm rest arrangement 5a is secured to the accommodating unit 8a of the supporting structure 4a in a form-fitting manner. In said installed position, the actuating member 6a is pressed back axially by the return spring 13 far enough that a cylindrical face end region of the latch bolt of the actuating member 6a holds the latch balls 10 compressed radially within the latch recesses 12 of the latch sleeve 11. Once the press button of the actuating member 6a is pressed towards the supporting structure 4a against the return force of the return spring 13, the annular groove 9 is forcedly urged to the radial level of the latch balls 10 and the latch recesses 12. As a result, the latch balls 10 are necessarily drawn radially inwards by means of the not illustrated elastic ring and plunge into the annular groove 9. As a result, the latch balls 10 expose the latch recesses 12 such that the actuating member 6a including the arm rest arrangement 5a can be extracted axially from the latch sleeve 11 of the accommodating unit 8a. During reattachment of the arm rest arrangement 5a, the latch bolt of the actuating member 6a is necessarily again inserted into the latch sleeve 11. The return force of the return spring 13 again urges the actuating member 6a axially away from the supporting structure 4a, whereby the latch balls 10 have to move aside radially outwards, since they are pressed radially outwards due to the corresponding conical ramp surface of the annular groove 9. Thereby, the latch balls 10 plunge back into the latch recesses 12 of the latch sleeve 11. In this way, the fixation unit 7a is again secured in the accommodating unit 8a in a form fitting manner.

Figure 6:
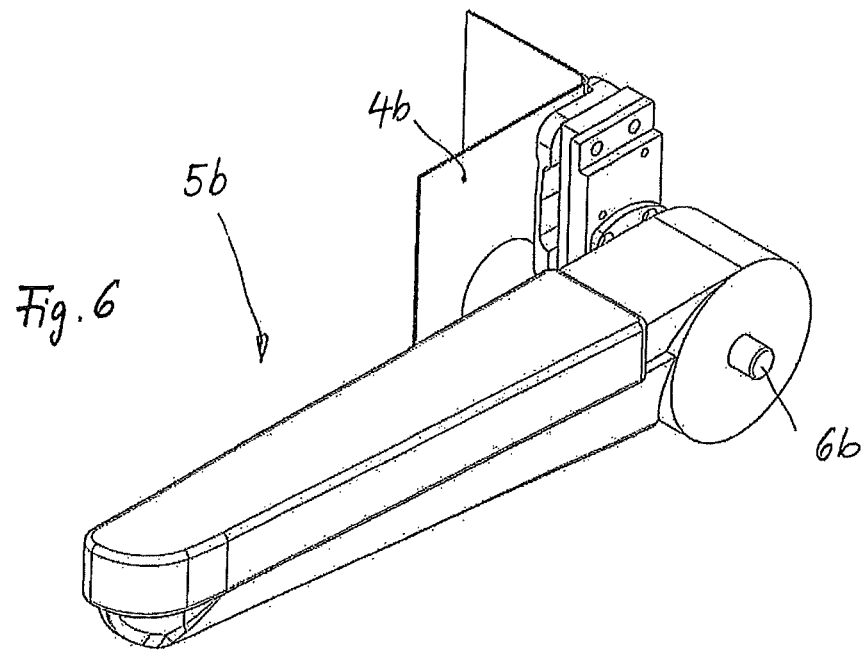
FIG. 6 shows a portion of a second embodiment of a vehicle seat according to the invention according to FIG. 1 similar to FIG. 2.
Figure 7:
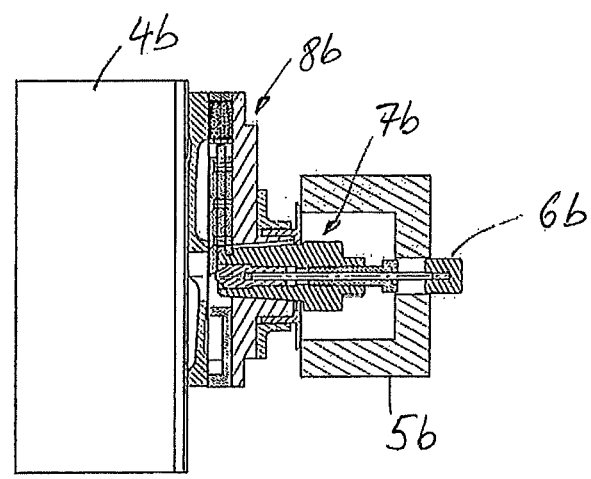
FIG. 7 shows a cross sectional view of the portion according to FIG. 6.
Figure 8:
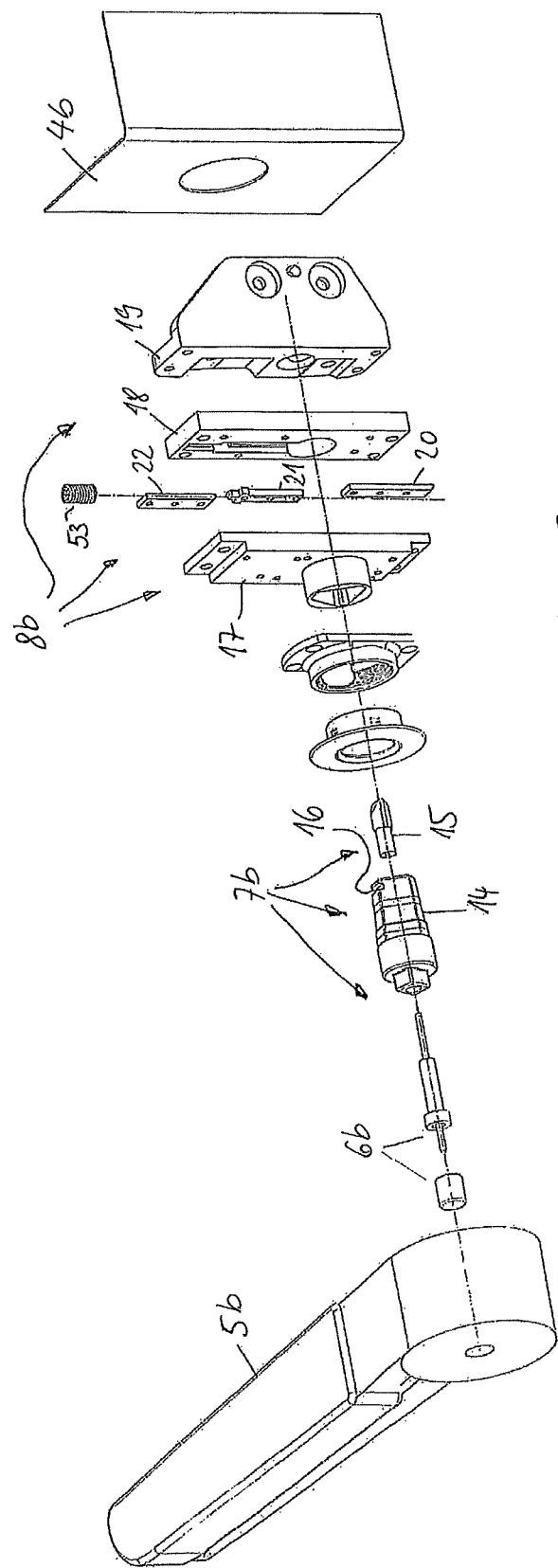
FIG. 8 shows the portion of the vehicle seat according to FIGS. 6 and 7 in a perspective exploded view.
Figure 9:
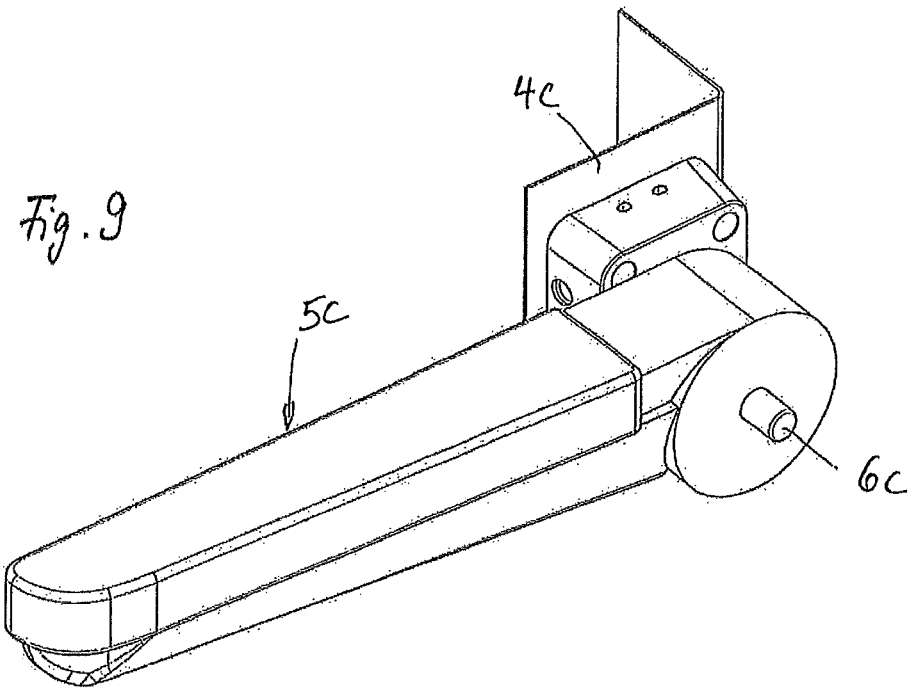
FIG. 9 shows a portion of a third embodiment of a vehicle seat according to the invention according to FIG. 1.

In the embodiment according to FIGS. 6 to 8, the arm rest arrangement 5b is held on an accommodating unit 8b of the supporting structure 4b by means of a fixation unit 7b. Securing of the arm rest arrangement 5b on the supporting structure 4b is obtained by a latching mechanism which can be released by means of an axial move of an actuating member 6b running along the attachment and detachment axis.

In detail, a plug wedge 14, having a rotationally non-symmetrical design relative to the attachment and detachment axis, is fixed to the arm rest arrangement 5b, with the actuating member 6b disposed therein for shifting in linear movement. The actuating member 6b includes a press button in the region of the exterior side of the arm rest arrangement 5b. On an opposite face end region the actuating member 6b includes a control wedge 15 cooperating with a latch wedge arrangement 20 to 22 in a manner that will be described in more detail below.

The accommodating unit 8b fixed to the supporting structure 4b includes a plug accommodation 17, with the accommodating region thereof having a complementary, rotationally non-symmetrical design as compared to the plug wedge 14. Moreover, the plug wedge 14 includes, in the region of an upper side, a latch groove 16 extending transversely to the attachment and detachment axis and open towards the top, wherein a latch slide 22 of the latch slide arrangement 20 to 22 plunges in a form-fitting manner. The latch slide arrangement 20 to 22 is mounted for shifting in a linear movement in a guide housing 18 radially in relation to the attachment and detachment axis. A return spring 53 in the form of a helical compression spring exerts a permanent return force on the latch slide arrangement 20 to 22 in the latching direction. The latch slide arrangement includes a connecting member 21 to position the latch slide 22 axially in relation to a control slide 20. The latch slide 22, the connecting member 21 and the control slide 20 adjoin in parallel—successively in the axial direction of the attachment and detachment axis—and are interconnected by screwed connections to a unit, namely, the latch slide arrangement. The control slide 20 projects into the trajectory of the control wedge 15, whereas the latch slide 22 in the installed condition plunges into the latch groove 16 of the plug wedge 14. Both the latch slide 22 and the control slide 20 have ramp surfaces on the lower faces edges thereof, which cooperate with corresponding end faces of the plug wedge 14 and the control wedge 15, respectively.

For installation of the arm rest arrangement 5b, the plug wedge 14 together with the arm rest arrangement 5b is plugged into the accommodating region 17 in a simple manner, whereby an end face of the plug wedge 14 urges the control slide 22 radially upwards in relation to the attachment and detachment axis, up to latching in of the control slide 22 in the latch groove 16. In order to allow detachment of the arm rest arrangement 5b, the press button of the actuating member 6b is pressed inwards axially in the direction of the supporting structure 4b in a simple manner, whereby the control wedge 15 pushes the control slide 20 upwards. As a result, the latch slide 22 is released from the latch groove 16 and the arm rest arrangement 5b can be taken off.

In the embodiment according to FIGS. 9 to 12, the arm rest arrangement 5c is held on the supporting structure 4c by a fixation unit 7c, which cooperates with an accommodating unit 8c, fixed to the supporting structure 4c, in a form-fitting manner. For securing the fixation unit 7c on the accommodating unit 8c a latching mechanism is provided, which will be described in more detail below, said latching mechanism being effective in a form-fitting manner axially in relation to the attachment and detachment axis. In order to allow transferring of the latching mechanism from the latched position to the released position thereof, an actuating member 6c is provided and mounted for linear movement in the arm rest arrangement 5c coaxially in relation to the attachment and detachment axis, and includes a press button which projects outwards beyond an exterior side of the arm rest arrangement 5c.

The fixation unit 7c includes a rotationally non-symmetrical plug wedge 25 which is fixed to the arm rest arrangement 5c. Moreover, two latch profile bodies 24 are fixed to an end face of the plug wedge 25 that is in front in the plug-in direction, which profile bodies present on their opposite longitudinal sides two latch grooves extending in parallel to a radial in the vertical direction. The two latch grooves are open towards the opposite sides of the plug wedge 25. Within the plug wedge 25 a control wedge 23 is guided for linear movement and firmly connected to a face end region of the actuating member 6c.

On the supporting structure 4c is fixed an accommodation housing 26 which is provided with a rotationally non-symmetrical plug accommodating region 27 complementary to the plug wedge 25. Two elastically pliable latch rods 29 project into the plug accommodating region 27, said rods oriented in parallel to each other in the vertical direction and retained in corresponding guidings 28 of the accommodation housing 26. Moreover, an adjustment device for adjusting the respective bending of the latch rods 29 is associated with the guidings 28. The two latch rods 29 are cylindrical spring steel wires. The adjustment device has a total of four adjusting screws 30 which are screwed in from opposite exterior sides into the accommodation housing 26 and plunge into the guidings 28. By corresponding turning of the adjusting screws 30 the latch rods 29 can assume arcuate curvatures in a common radial plane, wherein the arcuate orientations are in opposite directions. As a result, depending on the adjustment of the curvature by means of the adjusting device, a greater or a smaller clearance between the latch rods 29 can be obtained within the plug accommodating region 27.

The control wedge 23 is used to push the two latch rods 29 in the radial plane apart by operating the press button of the actuating member 6c and, thus, to release the plug wedge 25 in the region of the latch grooves formed by the latch profile bodies 24, for removal. The clearance between the latch rods 29 defines the compressive force that is needed to insert the control wedge 23 between the latch rods 29 and, thereby, to spread the latch rods 29. The thus produced retaining force by the latch rod 29 is adjusted during assembly of the accommodation housing 26 to the supporting structure 4c by the manufacturer.

Figure 10:
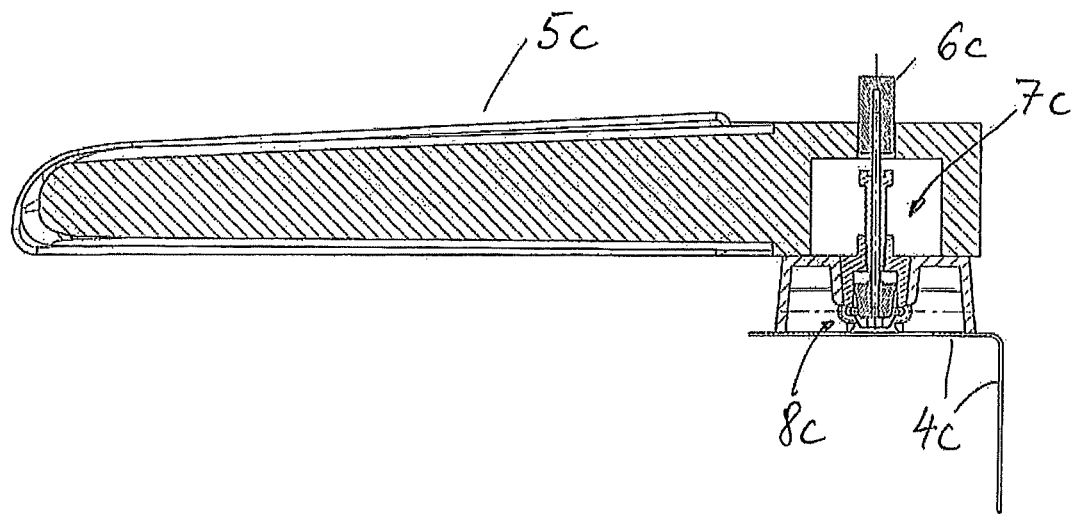
FIG. 10 shows a sectional view of the portion according to FIG. 9.
Figure 13:
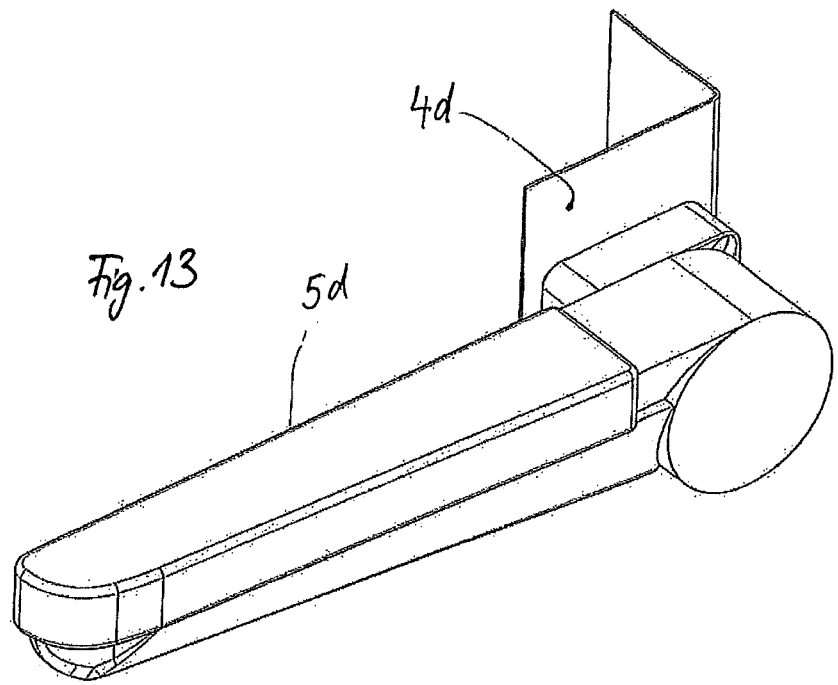
FIG. 13 shows in a perspective view a portion of a fourth embodiment of a vehicle seat according to the invention.
Figure 14:
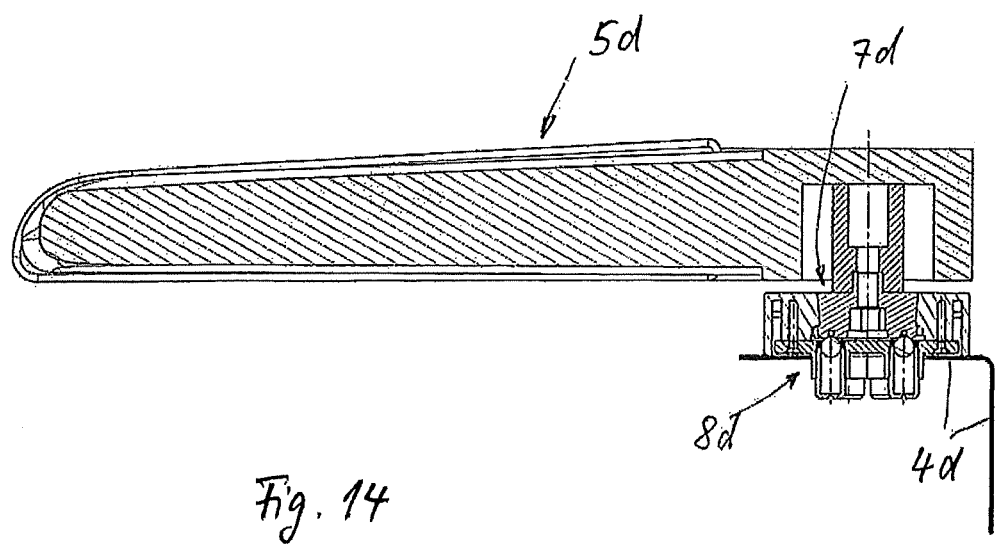
FIG. 14 shows a sectional view of the portion according to FIG. 13.

For releasing the arm rest arrangement 5c from the supporting structure 4c, according to FIG. 10, the press button of the actuating member 6c is pressed in a simple manner towards the direction of the supporting structure 4c, whereby the control wedge 23 spreads the latch rods 29 apart. As a result, the latch rods 29 are released from the latch grooves of the latch profile bodies 24 of the plug wedge 25 and the arm rest arrangement 5c can be taken off in a simple manner. During reattachment of the arm rest arrangement 5c, corresponding front-sided ramp surfaces of the latch profile bodies 24 of the plug wedge 25 urge the latch rods 29 apart in a simple manner, so that during an inserting procedure of the plug wedge 25 into the plug accommodating region 27 the latch rods 29 latch into the latch grooves in a simple manner. Again detaching is achieved by pressing the actuating member 6c again.

In the embodiment according to FIGS. 13 to 16, an arm rest arrangement 5d is held on an accommodating unit 8d of the supporting structure 4d by means of a fixation unit 7d. For securing the fixation unit 7d on the accommodating unit 8d, a latching mechanism is provided and includes a bayonet catch, which will be described in more detail below.

On the arm rest arrangement 5d a cylindrical actuating member 32 is provided, which is fixed to the arm rest arrangement 5d and causes latching or releasing of the latching mechanism essentially by a turning movement relative to the attachment and detachment axis. Accordingly, the arm rest arrangement 5d together with the actuating member 32 offers for the operator an engagement surface, in order to allow attaching or detaching of the arm rest arrangement 5d by a corresponding turning move. A bayonet latch part 31 is fixed to a face end region of the actuating member 32 facing away from the arm rest arrangement 5d, cooperating with a bayonet latch accommodation 34 of an accommodation housing 33, which is fixed to the supporting structure 4d. Additionally, a securing device 35, 36 is provided in the accommodation housing 33, which securing device includes a press body holder 35 and a plurality of press bodies 36. The press body holder 35 is fixed to the rear side of the accommodation housing 33. The press bodies 36 have cup-shaped housings, with securing balls projecting partially from each of the cup housings on the end face thereof and pressure is applied thereon by helical compression springs. Thereby, the securing balls are mounted for spring-elastic movement, axially in parallel to the attachment and detachment axis. The press bodies 36 are fixed in the press body holder 35 such that the securing balls project axially into the bayonet accommodation chamber 34 of the accommodation housing 33 on the bottom side of the accommodation housing 33. Once the bayonet plug body 31 is inserted axially into the bayonet accommodation chamber 34 and corresponding radially outwards protruding bayonet bars of the bayonet plug body 31 plunge into the complementary plug grooves of the bayonet accommodation chamber 34, the securing balls of the press bodies 36 are pushed back axially, once the face end of the bayonet plug body 31 abuts on the bottom face of the bayonet accommodation chamber 34 which is a face end of the press body holder 35. In this position the bayonet plug body 31 together with the actuating member 32 and the arm rest arrangement 5*d* is twisted by a certain rotational angle coaxially in relation to the attachment and detachment axis, whereby the radially outwards projecting bayonet latch bars are screwed into corresponding latch contours of the bayonet accommodation chamber 34 extending in the circumferential direction. Upon removal of the axial pressure load by the operator, the securing balls of the securing bodies 36 necessarily urge the face end of the bayonet plug body 31 axially back, whereby the bayonet plug body 31 is axially secured in the latch contour of the bayonet accommodation chamber 34.

In order to allow releasing of the arm rest arrangement 5*d* from said installed position, the arm rest arrangement 5*d* together with the actuating member 32 and the bayonet plug body 31 is firstly pushed axially inwards by the operator and, subsequently, turned by the above mentioned rotational angle in the opposite direction, whereby the securing balls are initially pushed back axially, in order to release the latch bars of the bayonet plug body 31 for the desired rotational movement. Subsequently, the securing balls of the securing bodies 36 urge the bayonet plug body 31 virtually self-actingly into the axial plug grooves of the bayonet accommodation chamber 34 in the taking-off direction, whereby subsequently, an axial taking-off of the arm rest arrangement 5*d* is enabled in a simple manner.

In the embodiment according to FIGS. 17 to 20, the arm rest arrangement 5*e* includes a fixation unit 7*e* which is connectable to an accommodating unit 8*e*, in order to secure the arm rest arrangement 5*e* to the supporting structure 4*e*. The accommodating unit 8*e* is fixed to the supporting structure 4*e*.

In detail, the arm rest arrangement 5*e* includes a holder 39 to which a plug wedge 38 is fixed, which plug is provided with a rotationally non-symmetrical outer plug contour. The plug wedge 38 includes two metallic pins 40 in the region of the front-sided face end thereof, which pins are made of a magnetizable metallic alloy, in particular made of steel. The metallic pins 40 are inserted axially into the front-sided face end of the plug wedge 38 and fixed in the plug wedge 38. Both the metallic pins 40 are free towards the front-sided face end. A circular disk-shaped actuating member 37 is rotatably mounted on the cylindrical holder 39. The circular disk-shaped actuating member 37 can be firmly connected to a pivotable arm rest part of the arm rest arrangement 5*e*, wherein the pivotable arm rest part is mounted for pivoting about the attachment and detachment axis relative to a stationary part of the arm rest arrangement 5*e* to which part the holder 39 and the plug wedge 38 are attached. With reference to FIG. 19 it is apparent that the circular disk-shaped actuating member 37, on the face end thereof that faces the supporting structure 4*e*, is provided with wedge-shaped ramp surfaces distributed over the circumference, which will be described in more detail below.

An accommodation housing 41 of the accommodating unit 8*e* is fixed to the supporting structure 4*e*. The accommodation housing 41 has a plug accommodation 42 which has, complementary to the rotationally non-symmetrical plug contour of the plug wedge 38, likewise a rotationally non-symmetrical design. The plug accommodating region 42 is open towards a rear side of the accommodation housing 41. A magnetic securing feature 43 is positioned in the rear side of the accommodation housing 41, which magnetic securing is composed of two superimposed permanent magnets which are fixed to a support plate, in particular by adhesive bonding. The support plate is fixed to the supporting structure 4*e*.

The accommodation housing 41 includes, moreover, in the region of a front side facing the arm rest arrangement 5*e*, a control contour circularly surrounding the plug accommodating region 42, which contour is provided with wedge-shaped ramp surfaces configured complementary to the ramp surfaces of the circular disk-shaped actuating ring 37.

For installing the arm rest arrangement 5*e*, the arm rest arrangement 5*e* is approached to the accommodation housing 41 in a simple manner and the plug wedge 38 is inserted into the plug accommodating region 42. In the procedure, the circular disk-shaped actuating member 37 is turned relative to the plug wedge 38 such that the complementary wedge-shaped ramp surfaces of the actuating member 37 and the accommodation housing 41 are mutually spaced in the circumferential direction. The magnetic force of the magnetic securing feature 43 draws the plug wedge 38 axially into the plug accommodating region 42 and secures the plug wedge 38 in the plug direction owing to the corresponding magnetic force. The magnetic force can act on the plug wedge 38, since the metallic pins 40 in the front side of the plug wedge 38 are attracted by the permanent magnet.

In order to allow taking-off of the arm rest arrangement 5*e*, the pivotable part of the arm rest arrangement 5*e* together with the circular disk-shaped actuating member 37 is pivoted to a minor extent in a simple manner (upwards in the illustration according to FIG. 20), whereby the actuating member 37 necessarily is urged axially away from the accommodation housing 41, once the wedge-shaped ramp surfaces of the accommodation housing 41 and the actuating member 37 run against each other. Since the actuating member 37 in relation to the plug wedge 38 and the holder 39 is movable in rotation, but axially secured, a turning of the actuating member 37 necessarily causes an axial displacement of the arm rest arrangement 5*e* and, thus, also of the plug wedge 38 axially outwards to a minor extent. As a result, the metallic pins 40 of the plug wedge 38 necessarily move axially away from the permanent magnets of the magnetic securing feature 43, whereby the magnetic force which is effective between the metallic pins 40 and the permanent magnets is reduced significantly. Said reduction of the magnetic force has the effect that the operator can take the arm rest arrangement 5*e* axially off in a simple manner.

Figure 21:
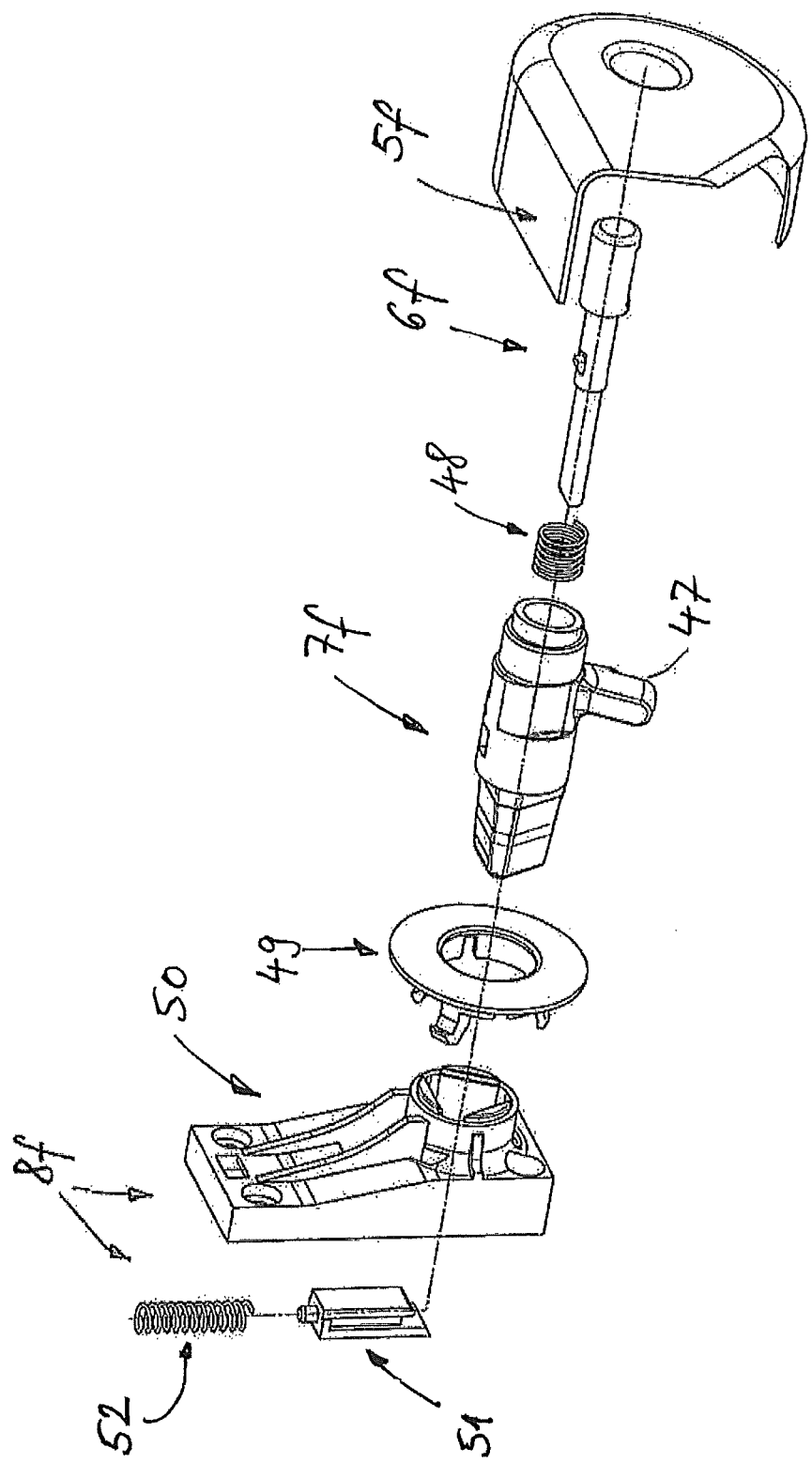
FIG. 21 shows a perspective exploded view of a portion of a further embodiment of a vehicle seat according to the invention similar to FIGS. 6 to 8.

The embodiment according to FIG. 21 corresponds to the embodiment according to FIGS. 6 to 8 in relation to functional principle and general construction. Components and portions of similar function are marked with the same reference numerals with the letter "f" added thereto. To avoid repetitions, reference is made to the explanations related to FIGS. 6 to 8. An essential difference with the embodiment according to FIG. 21 is in that the arm rest arrangement 5f is held on an accommodating unit 8f of simplified design of the supporting structure by means of the fixation unit 7f. The accommodating unit 8f has a simplified construction as compared to the accommodating unit 8b. In the embodiment according to FIGS. 6 to 8, the accommodating unit has a three-part plug accommodation housing 17 to 19, which is composed of a plug accommodation 17, a guide housing 18 and a fixation part 19. In contrast, in the embodiment according to FIG. 21, the accommodating unit 8f includes a one-piece plug accommodation housing 50, wherein a likewise one-piece latch slide arrangement 51 is held for shifting in linear movement. The latch slide arrangement 51 is embodied in a one-piece component made of synthetic material or metal produced in an injection molding or pressure die casting procedure. The plug accommodation housing 50 is also embodied in a one-piece component made of synthetic material or metal produced in an injection molding or pressure die casting procedure. The latch slide arrangement 51 combines therein the functions of the control slide 20, the connecting member 21 and the latch slide 22 of the embodiment according to FIG. 8. A return spring 52 has the same function as the return spring 53 according to FIG. 8.

In the embodiment according to FIG. 21, a snap panel 49 is provided and latchable to the plug accommodation housing 50 or the supporting structure (not illustrated). The fixation unit 7f includes a plug wedge, in analogy to the embodiments according to FIG. 8, wherein the actuating member 6f is disposed for shifting in linear movement. The actuating member 6f includes a press button which is secured in an initial condition by means of a return spring 48, wherein the press button projects beyond the exterior side of the arm rest arrangement 5f. The plug wedge of the fixation unit 7f includes an integrally molded radial extension 47 which acts as an abutment stop for the arm rest arrangement 5f.

The invention claimed is:

1. A vehicle seat comprising:
   a supporting structure having a seat surface and a back rest;
   at least one arm rest arrangement which is held on a complementary accommodating unit of the supporting structure;
   the at least one arm rest arrangement including a fixation unit which is capable of being attached to the complementary accommodating unit of the supporting structure and detached from the accommodating unit without a tool;
   wherein a first one of the fixation unit and the accommodating unit includes a sliding latching mechanism; and
   an actuating member engaging with the sliding latching mechanism to displace the sliding latching mechanism between a latched position for attaching the at least one arm rest arrangement to the accommodating unit of the supporting structure and a released position for detaching the at least one arm rest arrangement from the accommodating unit of the supporting structure;
   a second one of the fixation unit and the accommodating unit includes a latch receiving space, the sliding latching mechanism sliding into the latch receiving space when the sliding latching mechanism is in the latched position and out of the latch receiving space when the sliding latching mechanism is in the released position.

2. The vehicle seat according to claim 1, further including a spring for biasing the sliding latching mechanism into the latch receiving space.

3. The vehicle seat according to claim 1, wherein the actuating member includes a ramped device configured to engage with the sliding latching mechanism to move the sliding latching mechanism from the latched position to the released position.

4. The vehicle seat according to claim 1, wherein the actuating member does not rotate relative to the supporting structure.

5. The vehicle seat according to claim 1, wherein the sliding latching mechanism and the latch receiving space each have corresponding and engaging ramped surfaces.

* * * * *